(12) United States Patent
Schiel (10) Patent No.: US 11,775,514 B2
(45) Date of Patent: Oct. 3, 2023

(54) COMPUTER SYSTEM ARCHITECTURE AND APPLICATION FOR INTERCOMMUNICATIONS IN DIVERGENT DATABASE MANAGEMENT SYSTEMS

(71) Applicant: CERNER INNOVATION, INC., Kansas City, KS (US)

(72) Inventor: Toby A Schiel, Kansas City, KS (US)

(73) Assignee: Cerner Innovation, Inc., Kansas City, MO (US)

( * ) Notice: Subject to any disclaimer, the term of this patent is extended or adjusted under 35 U.S.C. 154(b) by 99 days.

(21) Appl. No.: 17/317,271

(22) Filed: May 11, 2021

(65) Prior Publication Data

US 2022/0365930 A1 Nov. 17, 2022

(51) Int. Cl.
*G06F 16/00* (2019.01)
*G06F 16/2452* (2019.01)
*G06F 16/25* (2019.01)

(52) U.S. Cl.
CPC ...... *G06F 16/24526* (2019.01); *G06F 16/252* (2019.01)

(58) Field of Classification Search
CPC .......... G06F 16/24526; G06F 16/252
See application file for complete search history.

(56) References Cited

U.S. PATENT DOCUMENTS

| | | | |
|---|---|---|---|
| 7,373,357 B2 | 5/2008 | Iyer et al. | |
| 7,533,128 B1 * | 5/2009 | Sanchez | G06F 16/20 707/999.102 |
| 8,005,854 B2 * | 8/2011 | Chawla | G06F 16/86 707/769 |
| 8,380,757 B1 * | 2/2013 | Bailey | H04L 41/024 717/109 |
| 8,396,894 B2 | 3/2013 | Jacobson et al. | |
| 9,372,902 B2 | 6/2016 | Hosie et al. | |
| 9,639,544 B1 | 5/2017 | Smith et al. | |
| 2003/0074248 A1 * | 4/2003 | Braud | G06Q 10/1093 705/7.18 |
| 2004/0128169 A1 * | 7/2004 | Lusen | G06Q 10/10 707/999.009 |
| 2005/0080759 A1 | 4/2005 | Brown et al. | |
| 2007/0162421 A1 | 7/2007 | Pang et al. | |
| 2010/0017442 A1 * | 1/2010 | Kaijima | G06F 9/542 719/318 |
| 2020/0272544 A1 * | 8/2020 | Carvelli | G06F 16/907 |
| 2021/0390081 A1 * | 12/2021 | Neill | G06F 16/178 |

OTHER PUBLICATIONS

Stackoverflow, Insert data in table after verifying username and password. (Year: 2019).*

* cited by examiner

*Primary Examiner* — Syed H Hasan
(74) *Attorney, Agent, or Firm* — Invoke (57) ABSTRACT

Methods, systems, and computer-readable media are disclosed herein that create inter-communication capabilities between servers that use technologically diverse and/or incompatible operating systems. Herein, a driver is leveraged to create these inter-communication capabilities by inserting a source server generated message into a table at the target server. The target server automatically executes code in the message and generates results therefrom. The target serer communicates the results to the source server, where the source server again leverages the driver to handle the results.

26 Claims, 4 Drawing Sheets

COMPUTER SYSTEM ARCHITECTURE AND APPLICATION FOR INTERCOMMUNICATIONS IN DIVERGENT DATABASE MANAGEMENT SYSTEMS

TECHNICAL FIELD

The present disclosure generally relates to a computer system architecture and an intercommunication application between servers operating in different database management systems.

BACKGROUND

Diverse relational database management systems generally require the creation of custom-encoded communication interfaces to enable communication with external systems that utilize different operating system. As such, for a source and target server having different operating systems, the source server must be configured with customized, non-reusable programming code in order send a communication to a target server, and the target server must also be configured with customized, non-reusable programming code in order to send a response back to the source server.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods, systems, and computer-readable media for a system architecture that supports the communication of any number and variety of messages communicated between diverse relational database systems that different operating environments, parameters, and/or configurations.

In aspects herein, one more non-transitory computer-readable media having computer-executable instructions embodied thereon are provided that, when executed, perform a method. The media generally comprise generating a message at a first server based on a request from a user device and adding the message to a first table at a second server. Code is executed in response to the message being added to the first table to generate results, and the results are added to a second table at the second server. The results are communicated from the second server to the first server, and then communicated from the first server to the user device.

In another aspect, one more non-transitory computer-readable media having computer-executable instructions embodied thereon are provided that, when executed, perform a method. In aspects, the media generate a message based on a request received from a user device. The message is communicated, via an Open Database Connectivity driver, from a first server to a second server, wherein the first and second server use incompatible operating systems. The message is inserted, via the Open Database Connectivity driver, into an input Structured Query Language (SQL) table at the second server. Code is executed in response to the message being added to the input SQL table and results are generated based on execution of the code. The results are inserted into an output SQL table at the second server. The results are communicated, via the Open Database Connectivity driver, from the output SQL table at the second server to the first server. The results are communicated from the first server to the user device.

In yet another aspect, a system is provided. The system comprises a first server using a first operating system and having an Open Database Connectivity driver. The system also comprises, in some aspects, a second server using a second operating system that is technologically incompatible with the first operating system, the second server having an input table and an output table. In aspects, the system further comprises one or more processors. The system is configured to, for each of a plurality of messages, and via the one or more processors, generate a message at the first server when a request is received by the first server from a user device. The message is inserted into an input SQL table at the second server using the Open Database Connectivity driver. Code is executed at the second server in response to the message being added to the input SQL table. Results are generated at the second server based on executing the code and the results are inserted into an output SQL table at the second server. The results are communicated from the output SQL table at the second server to the first server using the Open Database Connectivity driver, and then the results are communicates from the first server to the user device.

BRIEF DESCRIPTION OF THE DRAWINGS

Embodiments are described in detail below with reference to the attached drawings figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments herein provide a system architecture that supports the communication of any number and variety of messages communicated between diverse relational database systems that use different operating environments, parameters, and/or configurations. The system architecture provides a technological improvement that addresses technological limitations/problems found in other systems. Other systems require that each server in each relational database system be separately and uniquely encoded in order to facilitate any communication interface between the servers in the diverse relational database systems. In contrast, the system architecture provides a technological improvement because any number and variety of messages can be communicated between diverse relational database systems without separately and uniquely encoding each server to create a communication interface. The system architecture elegantly addresses and overcomes the above-described technological limitations/problems found in other systems by employing an Open Database Connectivity (ODBC) driver and a Structured Query Language (SQL) INSERT statement to enable communications between two or more diverse relational database systems without any customized coding. Additionally, the system architecture overcomes the above-described technological limitations/problems because the system architecture is generally technologically agnostic, meaning that the system architecture can create communications functionality in any platform that recognizes the SQL INSERT statement. Examples of such platforms include relational database management systems (RDBMS), such as InVision®, IBM Db2®, Oracle®, and InterSystems Caché®, including cloud-based systems, such as database as a service (DBaaS), Amazon Relational Database Service®, and SQL Azure®.

At a high level, the system architecture can use a trigger command, such as a SQL INSERT statement, to automatically insert a message sent from a first server (or "source" server) to a second server (or "target" server), for example, that uses a different operating system than the first server. The message is inserted automatically into a table at the second server, a function that is encoded in a computer-executable programming language (referred to as "code") in the message is automatically executed via one or more processors of the second server, and the results generated by performing the function are automatically populated into another table at the second server. The function can be a computer software program to gather data, to lookup data, to manipulate data (e.g., insert, update, delete), or to cause performance of server system operations. As used herein, a "function" refers to a computer-readable statement or command used to cause a processor to perform a pre-defined and/or user-defined action with regard to data, records, system operations, or the like. The results of executing the function can be sent from the second server back to the first server, as a responsive or return on the message that was sent and originally inserted. The results may indicate whether the function was successful or failed (e.g. flag). Additionally or alternatively, the results can identify, specify, and/or include one or more pieces of data, pages of data, values for parameters, server configurations, or the like. Aspects of this system architecture are also facilitated using an ODBC driver, as discussed hereinafter.

In one example of the system architecture, in order to return patient-specific information, a first server can generate and communicate a message that asks for the return of patient-specific information of a first patient. The message may be generated based on a request from a user device, in some instances. The message includes a first identifier of a first patient, a request to return patient-specific information that is specific to the first patient, and a trigger for returning said information, such as executable code. The first identifier that is specific to the first patient is utilized by the first server and its operation system, for example, to manage electronic clinical records, electronic clinical transactions, electronic clinical documents, and the like, that are also specific to the first patient. However, the second server from which the patient-specific information is being requested uses a different identifier for the same first patient, in one such example. As such, when the message is sent to the second server, the trigger in the message causes the second server to use the first identifier in the message to locate records associated with the different identifier being used for the same first patient. Using the identifier of the second server to find the records (data), results from those records are communicated back to the first server, as sent from the second server. The results may be a message in their own right, and the results can include a translation of the first identifier, i.e., the results specify the different identifier that is being utilized at the second server to manage electronic pharmacy records, electronic pharmacy transactions, electronic pharmacy documents, and the like, for the same first patient.

In another example of the system architecture, a first server can generate and communicate a message that requests the return of server-specific information. The message includes a request to return server-specific information, one or more parameters that define the particular server-specific information to be returned, and a trigger for returning said information, such as a PING command (e.g., as executable code). When the message is sent to the second server and inserted into a table, the PING command in the message causes the second server to locate, identify, recognize, and/or retrieve one or more server-specific pieces of information. Results are communicated back to the first server from the second server, wherein the results were generated as data that responds to the execution of the PING command. For example, the results can include one or more parameters of the second server, such as server's IP address, server name, operating environment, and the like. The results may be a message in their own right, in some instances.

In various aspects, the system architecture facilitates seamless compliance with information blocking regulations, albeit this is just one implementation that is supported and is in no way limiting.

Figure 1:
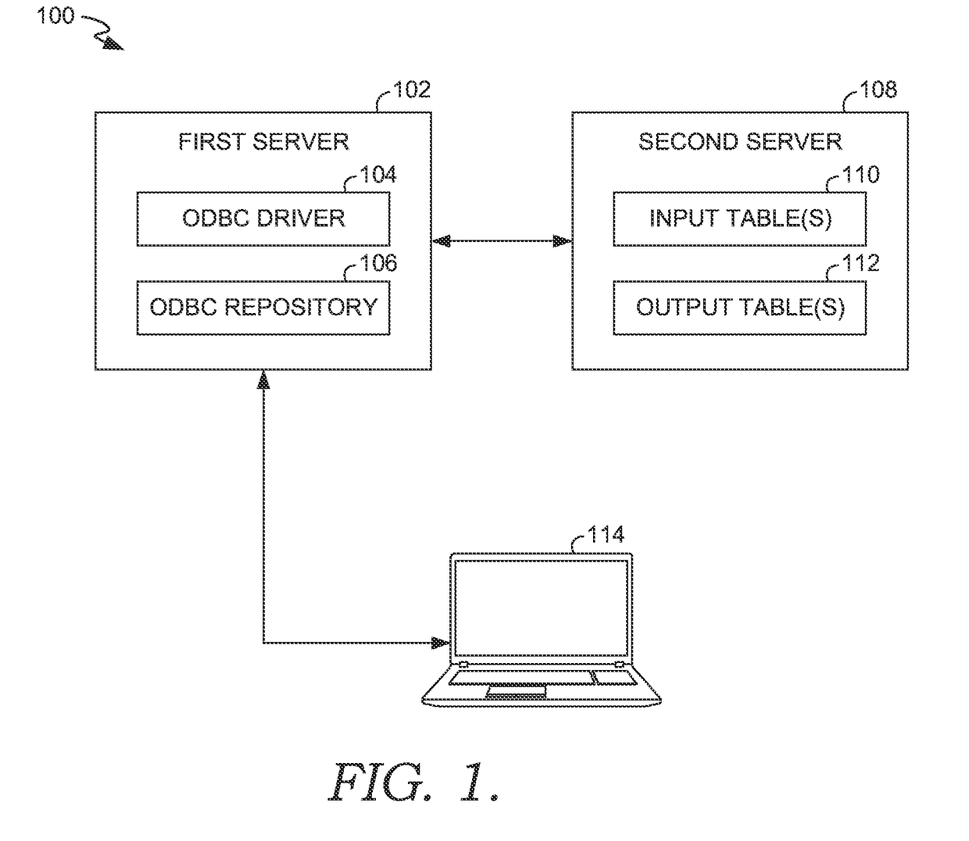
FIG. 1 is a block diagram of a system in accordance with aspects of the present invention.

Beginning with FIG. 1, a system 100 is provided. The system 100 includes a first server 102 and a second server 108. In aspects, the first server 102 and the second server 108 are relational databases and/or are operating within distinct relational database framework(s). In some aspects, the first server 102 may use a first operating system, such as a RDBMS. In one aspect, the first server 102 is a SQL server. In various aspects, the first server 102 includes an ODBC driver 104 and an ODBC repository 106. The ODBC driver 104 is a driver that acts as a translational layer between an application programming interface (API) and a RDBMS.

The system 100 can also include a second server 108, which may be local to the first server 102, remote from the first server 102, may be managed by the same entity (e.g., a clinical entity) as the first server 102, or may be managed by a different entity (e.g., a client of the clinical entity) than the first server 102. As such, the arrangement depicted in FIG. 1 is merely an example. Similarly, the system 100 is not limited to two servers. The second server 108 can use a second operating system that is technologically incompatible with the first operating system used by the first server 102, in some aspects. For example, the first server 102 and the second server 108 each operate within different RDBMS using distinct operations systems or configurations not shared by both servers. In one example, the first server 102 is associated with Oracle® while the second server 108 is associated with IDM Db2®, such that the servers do not have a compatible communication interface, in the absence of a custom-coded interface specifically made for each server to handle communications from the other servers' particular configuration. However, the second server 108 can recognize a SQL INSERT statement even if the second server 108 is not a SQL server, in the aspects discussed here. In such aspects, the ODBC driver 104 of the first server 102 is not ported for the operating system of the second server 108 and/or does not need to be ported to interface with the operating system of the second server 108, yet the second server 108 has an operating system of a respective RDBMS that can recognize the SQL INSERT statement. Generally, the ODBC driver 104 can be written using one or more industry standards that allows ODBC driver 104 to communicate with other servers that run various operating systems such as Microsoft Windows®, Linux®, OpenVMS®, IBM z/OS®, and the like.

The second server 108 includes an input table 110 and an output table 112, in aspects. A "table" refers to a database object having one or more rows and one or more columns, into which data/values are organized. Each row may correspond to a unique record that is associated with a unique record identifier, and each column may correspond to a field, category, attribute, domain, or the like. In an RDBMS, a table can also be referred to as a "relation" or a "tuple," in some instances. In various aspects, the second server 108 includes a plurality of tables that store data and relationships between the data. In this manner, the second server 108 is a "target" table from which the first server 102 can obtain information from the data and corresponding relationships, in aspects.

The system 100 can include a computing device 114, such as a user device. The user device may be local to one or more of the other system components, may be remote to one or more of the other system components, may be managed by the same entity (e.g., a clinical entity) as one or more of the other system components, or may be managed by a different entity (e.g., a client of the clinical entity) than one or more of the other system components. In aspects, the system is configured to, for each of a plurality of messages and via the one or more processors, perform one or more of the following steps. In some aspects, a message is generated by the first server when a request is received by the first server from a user device.

The message is added or inserted into a table, such as an input SQL table, at the second server, wherein the insertion is facilitated by the Open Database Connectivity driver of the first server. As such, the message can include a command, such as a SQL INSERT statement, in some aspects. Optionally, the second server recognizes a password that accompanies the message and validates the message when the password is a match to a trusted password stored at the second server. When validation of the message is successful, in such an example, the second server may take action in response to the successful validation, for example, by executing code. For example, code can be included in the message itself that is inserted into the input SQL table, and the SQL INSERT command triggers the second server to execute the code once the message has been inserted (and/or optionally validated). As such, the second server executes the code in response to the message being added to the input table, wherein the execution of the code is automatically triggered by the message being inserted into the table and/or by the performance of the SQL INSERT command. By way of executing the code, results are generated by the second server, and these results are added or inserted into another table, such as an output SQL table, of the second server. The results can be formatted using an XML stream format. Then, the results are communicated from that table at the second server to the first server, wherein this communication is also facilitated by the Open Database Connectivity driver. The first server can then communicate the results to the user device.

It should also be understood that the system 100 shown in FIG. 1 is only one example of a suitable system, and this example has been simplified for ease of discussion. Accordingly, other components not shown may also be included within the environment, and one or more of the shown component may be omitted, in various embodiments. Each of the components of FIG. 1 may be implemented using any type or number of computing devices, in embodiments. The components may communicate with each other directly or, for example, indirectly via a network, including one or more of a telecommunication network, a local area network (LANs), a wide area network (WANs), and/or a peer-to-peer-network. Such networking environments may include campus-wide or enterprise-wide computer networks, intranets, and the Internet. It should be understood that any number of components shown in FIG. 1 may be employed within the system 100 within the scope of the present invention. Each may be implemented via a single device or multiple devices cooperating in a distributed environment.

Figure 2:
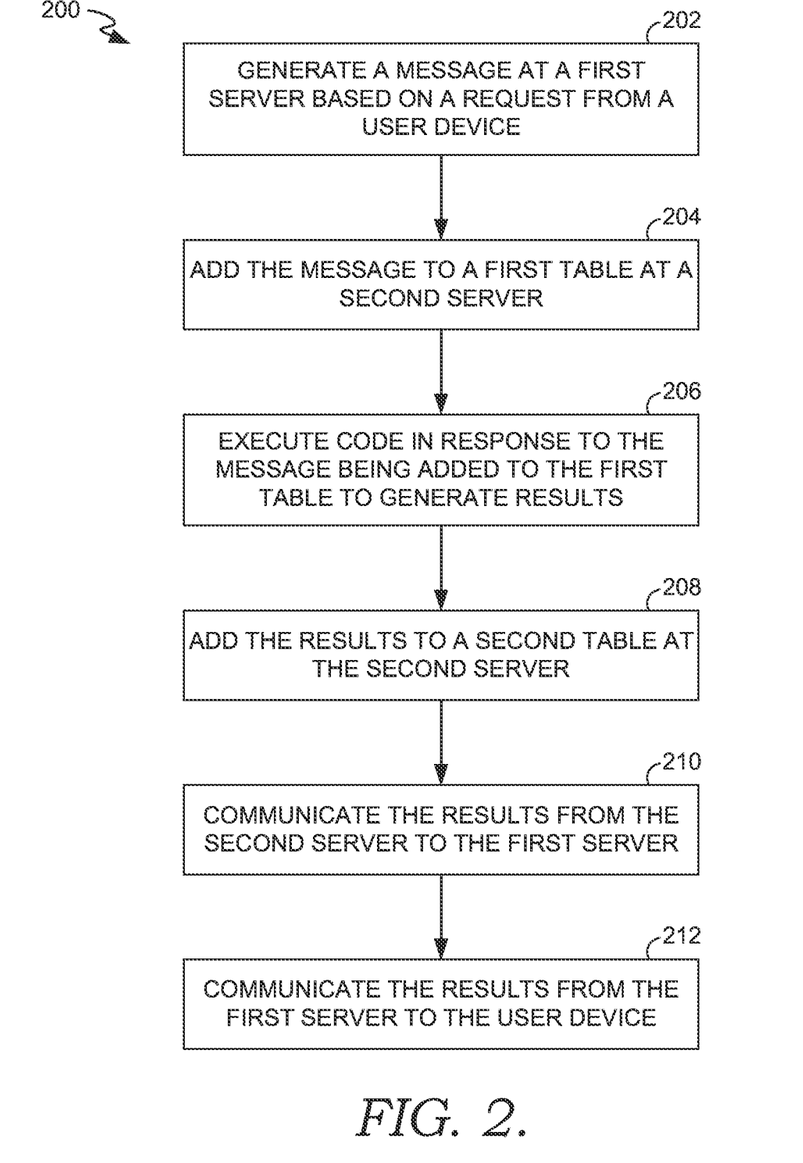
FIG. 2 is a flow diagram showing a method in accordance with aspects of the present invention.
Figure 3:
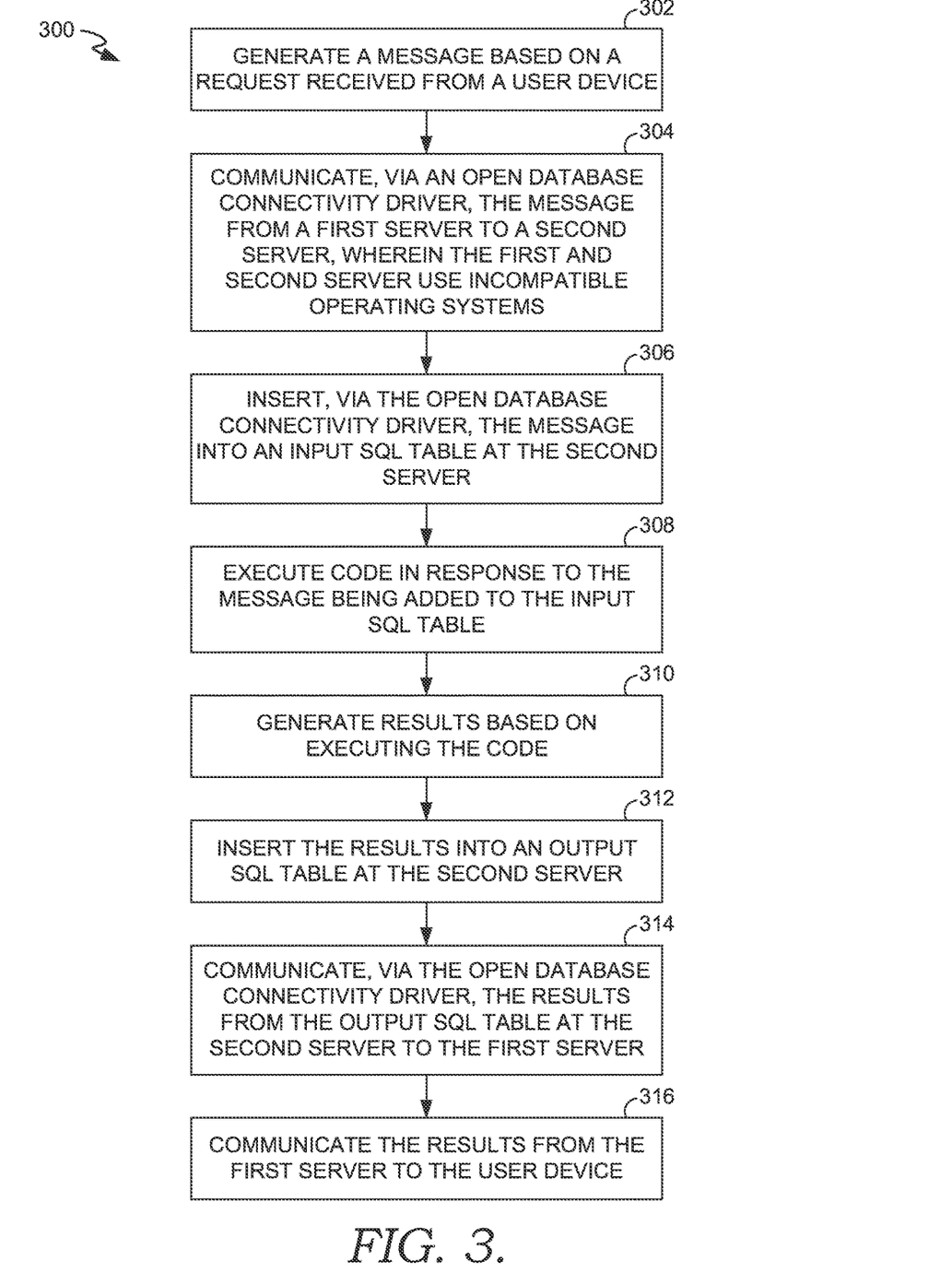
FIG. 3 is a flow diagram showing a method in accordance with aspects of the present invention.

Turning now to FIGS. 2 and 3, methods are discussed that can be performed via one or more of the components and component interactions described in FIGS. 1 and 4 (hereinafter). As such, the methods are discussed briefly for brevity, though it will be understood that the previous discussion and details described therein can be applicable to aspect of the methods of FIGS. 2 and 3. Additionally or alternatively, it will be understood that the methods discussed herein can be computer implemented. In some aspects, the methods can be implemented or performed via the execution of computer-readable storage instructions stored on computer readable media, by one or more processors. In such embodiments, one or more non-transitory computer-readable storage media having computer-readable instructions or computer-readable program code portions embodied thereon, for execution via one or more processors, can be used to implement and/or perform the methods. For example, computer-readable instructions or computer-readable program code portions can specify the performance of the methods, can specify a sequence of steps of the methods, and/or can identify particular component(s) of software and/or hardware for performing one or more of the steps of the methods, in embodiments. The computer-readable instructions or computer-readable program code portions can correspond to an application and/or an application programming interface (API), in some embodiments. In one embodiment, the application or API can implement and/or perform the methods. As discussed below, the methods can be performed using software, hardware, component(s), and/or device(s) depicted in the example of FIGS. 1 and 4.

Looking to FIG. 2, a method 200 is performed with regard to a first and second server that use different and/or technologically incompatible operating systems. An Open Database Connectivity driver is used to facilitate the transmission and communication of message(s) and/or result(s) between the first and second servers. At block 202, a message is generated at a first server based on a request received from a user device. In various aspects, the message may be generated automatically in response to the first server detecting receipt of a request. In some aspects, the message generated can include computer programming language that encodes a function, an identifier of the code for the function, a command for triggering execution of that code, a unique identifier of the message, or any combination thereof. The message can be automatically communicated to another server, in response to its own generation. At block 204, the message is added to a first table at a second server (e.g., to which the message was communicated). The message can be added or inserted directly into the first table, which can be an input table, for example. In some aspects, a command encoded in the message, such as a SQL INSERT statement, is used to automatically add or insert the message into a row in the table. At block 206, code is executed to generate results, in response to the message being added to the first table. For example, when the message includes code the code be executed, a command for triggering execution of the code in the message can be immediately performed and the code responsively executed by the second server. In various aspects, the code is thus executed automatically in response to the addition or insertion of the message into the table. At block 208, the results are added to a second table at the second server. The second table can be an output table, for example. At block 210, the results are communicated from the second server to the first server. The results are communicated to the first server, in some aspects, automatically in response to their own generation and/or addition to the table at the second server. At block 212, the results are communicated from the first server to the user device. The results can be communicated to the user device automatically, in some aspects. According, when a user device sends a request to the first server, the first server generates a message that is used to facilitate the second server's performance of a particular function that returns results, where those results are responsive to the request from the user device. The second server sends the results to the first server, and the first server "responds" to the request by returning the results to the user device.

Continuing to FIG. 3, a method 300 is performed with regard to a first and second server that use different and/or technologically incompatible operating systems. An Open Database Connectivity driver is used to facilitate communication of message(s) and/or result(s) between the first and second servers. In some aspects, the method 300 is performed in response to a request from a user device, for example, wherein the request seeks the return of patient-specific information in a specified or predefined format. In the method 300, at block 302, a message is generated based on such a request received from a user device. In aspects, the message can include computer code (and/or an identifier of the computer code, such as a function name) and a command that triggers a processor to initiate execution of that particular code. The code within the message can include a computer program, computer function, or the like that can be executed in order to gather data, to manipulate data, and/or to perform system operations, as defined by the code, and optionally, one or more parameters included in the code and/or message.

The message generated at the first server can include a request for specific information (e.g., patient specific information, site specific information, or server configuration specifications), in some aspects. The message can also include code for a function that, when performed, produces results that are responsive to the message (i.e., generated based on the request from the user device), for example, by finding or locating the specific information. For example, a command for a function that performs one or more of data gathering, data lookup, data searching, data manipulation, system operation queries, and/or system performance measurements can be identified by name or by code in the message. In one example, a first server can generate this message that request the return of server-specific information, such as one or more parameters or configurations that define the particular server-specific information to be returned. In this example, the message can also include a trigger for returning the server-specific information specified, such as a PING command. In another example, the first server can generate a message that asks for the return of patient-specific information for a first patient, John Doe. In one such example, the message includes a first identifier of a first patient ("John Doe"), a request to return patient-specific information that is specific to the first patient, and a trigger for returning said information. In these examples, the message can also include a SQL INSERT statement that automatically adds or inserts the message into a table at the second "target" server.

A message could be a structured string, shown by the following example: INPUT_DATA=Mes sageName|MessagePassword|MessageParameterData In aspects, the message can include a unique key that is specific to the one message and thus, the unique key can be used within the system to track the message's transmission from the first server and receipt of the message at the second server. A unique key for the one message could be shown as, for example: INPUT_KEY=GUID|MM/DD/YYYY HH:MM:SS:MMM Additionally or alternatively, the message can include a security token or password. The security token or password can be used by the second server to validate the authenticity and security (e.g., message is not malware) of the message, in such an aspects.

Continuing to block 304, the message is communicated, via an Open Database Connectivity driver, from the first server to the second server. In some aspects, the first server is specifically a SQL-configured server while the second server utilizes a different operating system. At block 306, via the Open Database Connectivity driver, the message is inserted into an input SQL table at the second server. In various aspects, the message is automatically inserted based on a SQL INSERT statement within the message. Then, code is executed in response to the message being inserted into the input SQL table, shown at block 308. As discussed above, the code is part of the message itself. In various aspects, the second server, via one or more processors, reads the message that was inserted into the table. The message can include parameter data for the computer function to be performed by executing the code, in some aspects. In such an aspect, the code is executed using the parameters as constraints or specifications for execution of the computer function and/or as constraints or specifications for results obtained in response to the performance of the computer function.

In some aspects, the code within the message (e.g., in addition to a trigger such as a SQL INSERT statement) is not executed until or unless the message containing the code has been validated by the second server. For example, in such instances when the message contains a security token or password, the second server may determine whether the security token or password is a match to a security token or password stored as "trusted" by the second server. When the security token or password is a match, the second server may validate the message. As such, in such aspects, the security token or password of the message is validated or confirmed by the second server, after which the message is inserted into the input SQL table at the second server (i.e., inserted subsequent to confirmation). Alternatively, the security token or password of the message is validated or confirmed by the second server after the message has been inserted into the input SQL table at the second server (i.e., inserted and then confirmed). In some aspects, after confirmation or validation of the message using a security token or password, the second server executes the code in response to the message being added to the input SQL table.

At block 310, results are generated based on execution of the code at the second server. The results are then inserted, at block 312, into an output SQL table at the second server. The results that are "generated" at the second server may include data that has been gathered and/or looked up as specified in the code executed and/or parameters, data that results from a query or search as specified in the code executed and/or parameters, data that was manipulated as specified in the code executed and/or parameters, or any combination thereof. As such, the results are a direct consequence of the code that is executed. Additionally or alternatively, in various aspects, the results may include an indicator of "success" or "fail," wherein the indicator indicates whether the executed code produced results, such as locating data according to one or more parameters in the message. In one example, a success may be indicated by a value of "1" while a failure may be indicated by a value of "0" or a negative value, e.g., "−1" or "−2". The value itself may be provided as the result, or the value may be included with results. Additionally, the result may include values returned, a date and time, an error type, an error identifier, and the like.

For example, a result indicating a success using the value "1" could be shown as:

```
<RESULT><RXId1>0001</RXId1><RXId2>5776</RXId2><RXId3>1949</RXId3><ENTABR></ENTABR><VISITNUM></VISITNUM><STATUSCODE> 1 </STATUSCODE>
<STATUSMESSAGE>Result Posted 10/27/2020 11:00 </STATUSMESSAGE></RESULT>
```

In one example, a result indicating a failure using the value "0" could be shown as: <RESULT><STATUSCODE>−1</STATUSCODE><STATUSMESSAGE>Error executing Trigger 0556, Error=Fail_Error_1 11/4/2020 09:13:15.03</STATUSMESSAGE></RESULT>

In various aspects, the results are modified and/or transformed into the specified format, such as XML stream format. In some aspects, the results may be automatically populated into a User Data Access (UDA) Table in a read-only, SQL-compliant format. In various aspects, when a unique key was included with the originally received message sent by the first server, that same unique can be associated with and included with the results in the table for the purpose of designated that these particular results correspond to the one particular message. In such as aspect, the unique key may act as an identifier for both the message and its corresponding results. Additionally or alternatively, the results may also include a date and time (e.g., hour, minute, second, milliseconds in a numerical format of hh:mm:ss:mmm) in order to uniquely identify and/or distinguish the particular set of results from other results.

At block 314, the results are communicated, via the Open Database Connectivity driver, from the output SQL table at the second server to the first server. In some aspects, where the message had included a unique key that is specific to the one message, the same unique key can be communicated with the results to the first server for tracking. At block 316, the results are communicated from the first server to the user device. Again, in one aspect, the unique key is also communicated to the user device with the results, so that the results can be matched to the originally-provided request from the user device for which the first server had generated the message.

In addition to the methods above, some aspects include logging the message that is inserted into the input table and the results inserted into the output table within an audit file for the second server. The audit file creates visibility for each of a plurality of messages handled by the system, for example, with regard to whether executed code was successful or failed to produce data in accordance with the code, and optionally, one or more parameters specified in said message(s).

Yet another method is provided herein, for example, where the first server is controlled by a first entity (e.g., a clinical entity) and the second server is controlled by a second entity (e.g., a client). In one such aspect, a message is generated based on a request received from a user device. The message is to be communicated from a first server to a second server that uses an incompatible operating system. In this aspect, the message is communicated from a first server to a second server. The message includes a command that causes the message itself to be inserted into an input SQL table at the second server, wherein insertion of the message further causes code in the message itself to be executed at the second server, and wherein in response to execution of the code at the second server, results are generated and inserted into an output SQL table at the second server. In such aspects, when the results are received by the first server as communicated from the second server, the results are then communicated from the first server to the user device.

Figure 4:
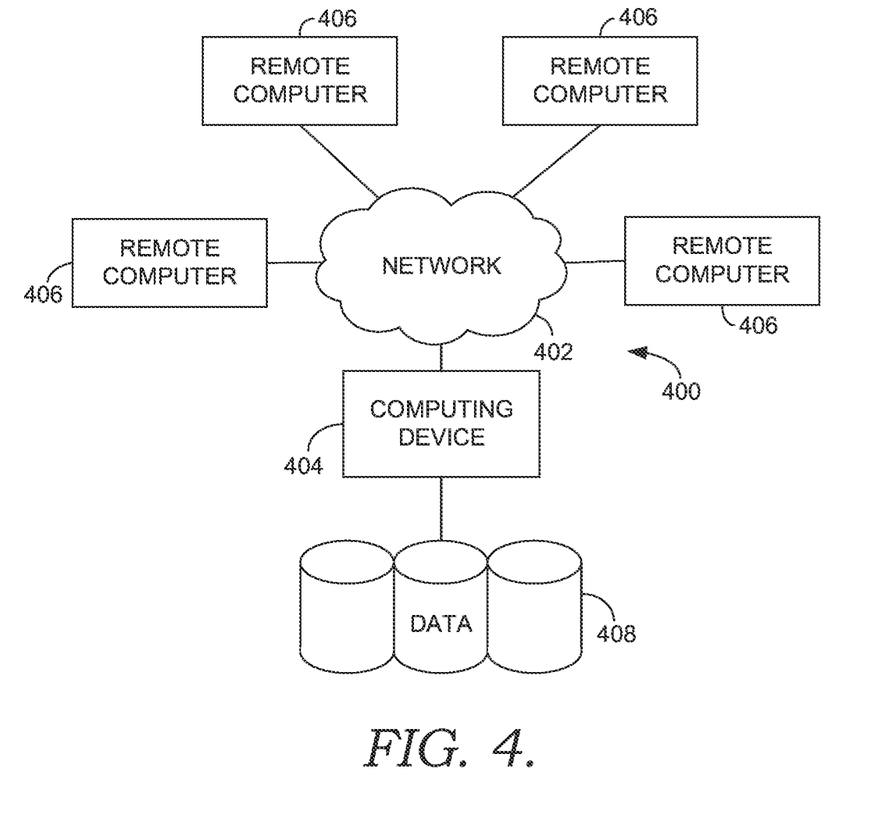
FIG. 4 depicts an example computing environment in accordance with embodiments of the present invention.

Turning now to with FIG. 4, an exemplary computing environment is depicted, in accordance with an embodiment of the present invention. It will be understood by those of ordinary skill in the art that the exemplary computing environment 400 is just one example of a suitable computing environment and is not intended to limit the scope of use or functionality of the present invention. Similarly, the computing environment 400 should not be interpreted as imputing any dependency and/or any requirements with regard to each component and combination(s) of components illustrated in FIG. 4. It will be appreciated by those having ordinary skill in the art that the connections illustrated in FIG. 4 are also exemplary as other methods, hardware, software, and devices for establishing a communications link between the components, devices, systems, and entities, as shown in FIG. 4, may be utilized in implementation of the present invention. Although the connections are depicted using one or more solid lines, it will be understood by those having ordinary skill in the art that the exemplary connections of FIG. 4 may be hardwired or wireless, and may use intermediary components that have been omitted or not included in FIG. 4 for simplicity's sake. As such, the absence of components from FIG. 4 should be not be interpreted as limiting the present invention to exclude additional components and combination(s) of components. Moreover, though devices and components are represented in FIG. 4 as singular devices and components, it will be appreciated that some embodiments may include a plurality of the devices and components such that FIG. 4 should not be considered as limiting the number of a device or component.

Continuing, the computing environment 400 of FIG. 4 is illustrated as being a distributed environment where components and devices may be remote from one another and may perform separate tasks. The components and devices may communicate with one another and may be linked to each other using a network 402. The network 402 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 402, generally, provides the components and devices access to the Internet and web-based applications.

The computing environment 400 comprises a computing device 404, which may be in the form of a server. Although illustrated as one component in FIG. 4, the present invention may utilize a plurality of local servers and/or remote servers in the computing environment 400. The computing device 404 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The computing device 404 may include or may have access to computer-readable media. Computer-readable media can be any available media that may be accessed by computing device 404, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 404. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the computing device 404 uses logical connections to communicate with one or more remote computers 406 within the computing environment 400. In embodiments where the network 402 includes a wireless network, the computing device 404 may employ a modem to establish communications with the Internet, the computing device 404 may connect to the Internet using Wi-Fi or wireless access points, or the server may use a wireless network adapter to access the Internet. The computing device 404 engages in two-way communication with any or all of the components and devices illustrated in FIG. 4, using the network 402. Accordingly, the computing device 404 may send data to and receive data from the remote computers 406 over the network 402.

Although illustrated as a single device, the remote computers 406 may include multiple computing devices. In an embodiment having a distributed network, the remote computers 406 may be located at one or more different geographic locations. In an embodiment where the remote computers 406 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some embodiments, the remote computers 406 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computers 406 may be physically located in a non-medical setting, such as a packing and shipping facility or deployed within a fleet of delivery or courier vehicles.

Continuing, the computing environment 400 includes a data store 408. Although shown as a single component, the data store 408 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 408 includes physical memory that is configured to store information encoded in data. For example, the data store 408 may provide storage for computer-readable instructions, computer-executable instructions, data structures, data arrays, computer programs, applications, and other data that supports the functions and action to be undertaken using the computing environment 400 and components shown in exemplary FIG. 4.

In a computing environment having distributed components that are communicatively coupled via the network 402, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular abstract data types. In embodiments, the computing device 404 may access, retrieve, communicate, receive, and update information stored in the data store 408, including program modules. Accordingly, the computing device 404 may execute, using a processor, computer instructions stored in the data store 408 in order to perform embodiments described herein.

Although internal components of the devices in FIG. 4, such as the computing device 404, are not illustrated, those of ordinary skill in the art will appreciate that internal components and their interconnection are present in the devices of FIG. 4. Accordingly, additional details concerning the internal construction device are not further disclosed herein.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. One or more non-transitory computer-readable media having computer-executable instructions recorded thereon that, when executed by a hardware processor, cause performance of operations comprising:
    generating a message by a first server based on a request from a user device, the message comprising code that generates results when executed;
    adding the message to a first table at a second server, wherein the adding triggers:
        execution of the code in the first table by the second server, and
        generation of the results in a second table by the second server;
    obtaining, by the first server from the second server, the results from second table at the second server; and
    communicating the results from the first server to the user device.

2. The media of claim 1, wherein the first table is an input table and the second table is an output table.

3. The media of claim 1, wherein the message includes an identifier of the code to be executed, a command for triggering execution of the code, and a unique identifier of the message.

4. The media of claim 1, wherein:
    the operations further comprise communicating the message from the first server to the second server, and
    the first and second server use technologically incompatible operating systems.

5. The media of claim 4, wherein an Open Database Connectivity driver is used for communicating the message from the first server to the second server.

6. The media of claim 1, wherein:
    the operations further comprise communicating the results from the second server to the first server, and
    the first server and the second server utilize technologically incompatible operating systems.

7. The media of claim 6, wherein an Open Database Connectivity driver is used when communicating the results from the second server to the first server.

8. The media of claim 1, wherein the operations further comprise:
    adding a portion of the message to the first table in response to detecting the code.

9. The media of claim 8, wherein adding the portion of the message to the first table comprises executing a Structured Query Language (SQL) command.

10. The media of claim 1, wherein the operations further comprise:
    adding the results to a second table at the second server.

11. The media of claim 10, wherein:
    the results comprise one or more parameters of the second server; and
    communicating the results comprises communicating the results to the first server using the one or more parameters.

12. One or more non-transitory computer-readable media having computer-executable instructions recorded thereon that, when executed by a hardware processor, cause performance of operations comprising:
    generating a message by a first server based on a request received from a user device, the message comprising code that generates results when executed;
    communicating, via an Open Database Connectivity driver, the message from the first server to a second server, wherein the first and second server use incompatible operating systems;
    inserting, via the Open Database Connectivity driver, the message into an input Structured Query Language (SQL) table at the second server, wherein the inserting triggers:
        execution of the code in the input SQL table by the second server, and;
        generation of the results in an output SQL table by the second server;
    obtaining, by the first server from the second server, via the Open Database Connectivity driver, the results from the output SQL table at the second server; and
    communicating the results from the first server to the user device.

13. The media of claim 12, wherein the message further comprises a command that triggers the second server to initiate execution of the code.

14. The media of claim 13, wherein the code specifies whether to gather data at the second server, to manipulate data at the second server, or perform functions at the second server.

15. The media of claim 12, wherein the message includes a unique key for the message, a security password, a command to execute the code, and the code.

16. The media of claim 15, wherein:
    the operations further comprise confirming, by the second server, the security password of the message, and inserting the message into the input SQL table at the second server subsequent to confirmation.

17. The media of claim 16, wherein the unique key for the message is used when communicating the results from the first server to the user device.

18. The media of claim 12, wherein the operations further comprise receiving the request from the user device for patient-specific information in a specified format.

19. The media of claim 18, wherein:
the operations further comprise transforming the results into the specified format, and the results correspond to the patient-specific information requested in the request.

20. A system comprising
one or more hardware processors; and
a non-transitory computer-readable medium storing program instructions,
wherein execution of the program instruction by the one or more processors control the one or more processors to perform operations comprising:
generating a message by a first server based on a request received from a user device, the message comprising code that generates results when executed;
inserting, by the first server, the message into an input SQL table at a second server using an Open Database Connectivity driver, wherein the inserting triggers:
execution of the code in the input SQL table by the second server;
generation of the results in an output SQL table by the second server;
obtaining, by the first server from the second server, the results from the output SQL table using the Open Database Connectivity driver; and
communicating the results from the first server to the user device.

21. The system of claim 20, the message is inserted into the input SQL table at the second server using the Open Database Connectivity driver and a SQL INSERT command.

22. The system of claim 20, wherein the results inserted into the output SQL table have an XML stream format.

23. The system of claim 20, wherein:
the second server validates the message when the message includes a password recognized by the second server, and
the code is executed in response to the second server validating the message.

24. A method comprising:
generating a message by a first server based on a request from a user device, the message comprising code that generates results when executed;
adding the message to a first table at a second server, wherein the adding triggers:
execution of the code in the first table by the second server, and
generation of the results in a second table by the second server;
obtaining, by the first server from the second server, the results from second table at the second server; and
communicating the results from the first server to the user device.

25. A system comprising:
one or more hardware processors; and
a non-transitory computer-readable medium storing program instructions,
wherein execution of the program instruction by the one or more processors control the one or more processors to perform operations comprising:
generating a message by a first server based on a request from a user device, the message comprising code that generates results when executed;
adding the message to a first table at a second server, wherein the adding triggers:
execution of the code in the first table by the second server, and
generation of the results in a second table by the second server;
obtaining, by the first server from the second server, the results from second table at the second server; and
communicating the results from the first server to the user device.

26. A method comprising:
generating a message by a first server based on a request received from a user device, the message comprising code that generates results when executed;
communicating, via an Open Database Connectivity driver, the message from the first server to a second server, wherein the first and second server use incompatible operating systems;
inserting, via the Open Database Connectivity driver, the message into an input Structured Query Language (SQL) table at the second server, wherein the inserting triggers:
execution of the code in the input SQL table by the second server, and;
generation of the results in an output SQL table by the second server;
obtaining, by the first server from the second server, via the Open Database Connectivity driver, the results from the output SQL table at the second server; and
communicating the results from the first server to the user device.

* * * * *